(12) United States Patent
Ricciuti et al.

(10) Patent No.: US 9,356,435 B2
(45) Date of Patent: May 31, 2016

(54) SWITCHGEAR ENCLOSURE HOUSING ASSEMBLY INCLUDING AN EXTENDABLE CONDUCTOR ASSEMBLY

(71) Applicant: Eaton Corporation, Cleveland, OH (US)

(72) Inventors: Anthony Thomas Ricciuti, Bethel Park, PA (US); Douglas Michael Brandt, Wampum, PA (US)

(73) Assignee: EATON CORPORATION, Cleveland, OH (US)

( * ) Notice: Subject to any disclaimer, the term of this patent is extended or adjusted under 35 U.S.C. 154(b) by 75 days.

(21) Appl. No.: 14/446,446

(22) Filed: Jul. 30, 2014

(65) Prior Publication Data

US 2016/0036205 A1    Feb. 4, 2016

(51) Int. Cl.
*H02B 1/20*    (2006.01)
*H02B 11/28*    (2006.01)
*H02B 13/02*    (2006.01)

(52) U.S. Cl.
CPC ..................................... *H02B 13/02* (2013.01)

(58) Field of Classification Search
None
See application file for complete search history.

(56) References Cited

U.S. PATENT DOCUMENTS

| | | | | |
|---|---|---|---|---|
| 6,958,456 B1 * | 10/2005 | Jur | ........................... | H01H 3/20 200/43.16 |
| 6,998,550 B1 * | 2/2006 | Jur | ....................... | H02B 11/133 200/335 |
| 8,760,853 B1 * | 6/2014 | Bullock | ................. | H02B 11/04 200/50.21 |
| 2008/0080117 A1 * | 4/2008 | Parker | .................... | H02B 11/28 361/220 |
| 2013/0334023 A1 * | 12/2013 | Miller | .................. | H01H 31/003 200/52 R |
| 2015/0318122 A1 * | 11/2015 | Frye | ........................ | H02B 1/04 235/382 |

* cited by examiner

*Primary Examiner* — Courtney Smith
(74) *Attorney, Agent, or Firm* — Eckert Seamans Charin & Mellott, LLC; David C. Jenkins; Grant E. Coffield

(57) ABSTRACT

An enclosure housing assembly for an electrical switching apparatus is provided. The enclosure housing assembly includes a sidewall assembly, a movable carriage assembly, a ground bus bar assembly and a movable terminal assembly with an extendable conductor assembly. The sidewall assembly includes a number of sidewalls defining an enclosed space. The movable carriage assembly is movable between a withdrawn, first position. Wherein the movable carriage assembly is disposed partially outside the enclosure sidewall assembly enclosed space, and an inserted, second position, wherein the movable carriage assembly is disposed substantially inside the enclosure sidewall assembly enclosed space. The ground bus bar assembly is coupled to the first sidewall. The movable terminal assembly is coupled to the movable carriage assembly whereby the movable terminal assembly moves with the movable carriage assembly. The extendable conductor assembly is coupled to, and in electrical communication with, the ground bus bar assembly.

14 Claims, 3 Drawing Sheets

US 9,356,435 B2

SWITCHGEAR ENCLOSURE HOUSING ASSEMBLY INCLUDING AN EXTENDABLE CONDUCTOR ASSEMBLY

BACKGROUND OF THE INVENTION

1. Field of the Invention

The disclosed concept relates to a switchgear and, more particularly, to a switchgear wherein an enclosure housing assembly includes an extendable conductor assembly and a ground bus bar assembly that does not extend over the path of travel of a movable carriage assembly.

2. Background Information

Electrical switching apparatus, such as but not limited to circuit breakers, are often disposed in an enclosure or housing assembly. The electrical switching apparatus is disposed on, or is incorporated with, a movable carriage assembly. When the electrical switching apparatus need repair or other maintenance, the electrical switching apparatus is drawn, at least partially, from the enclosure. The removal of the electrical switching apparatus from the housing assembly may, or may not, decouple the electrical switching apparatus from the power source (hereinafter "line") and/or the load. For the safety of the operators, a movable carriage assembly ground connection, i.e. a grounded conductor, is required by various regulations and safety procedures. For example, the frame of the circuit breaker is, typically, an electrically conductive material which needs to be coupled to ground whenever secondary wiring connections mate and/or become energized with electrical power The ground connection allows the electrical switching apparatus to be in electrical communication with the ground continuously from the fully inserted/connected position until the electrical switching apparatus is drawn out a safe distance from the housing assembly. The purpose of this grounding feature is to protect operators from injury as a result of an electrical issue in the secondary control voltage system, which is typically less than 250 volts. The ground connection is also used with Ground and Test Devices that connect the primary voltage terminals, which typically can carry up to 15,000 volts, to ground so that the operators are protected while working on the conductor buses.

To allow for such a continuous ground connection, the housing assembly includes a large conductive bar (hereinafter "ground bar"), such as, but not limited to a copper bar, secured to the housing assembly. Further, the electrical switching apparatus includes a sliding electrical coupling that is structured to be slidably coupled to, and in electrical communication with, the ground bar. That is, the ground bar extends over the path of travel of the electrical switching apparatus so that as the electrical switching apparatus moves out of, or into, the housing assembly, the sliding electrical coupling moves along the ground bar maintaining the electrical switching apparatus in a grounded state.

Because advancing technology continually reduces the overall size of an electrical switching apparatus and the associated housing assembly, physically locating large conductive bars that extend the full length of the housing assembly is becoming increasingly difficult. Additionally, market demand for copper makes large ground bars expensive. By employing a short ground bar at the rear of the housing assembly, testing equipment can still effectively connect to, and provide the shunted path for, primary voltage and current; however, the requirement for a continuous connection throughout the draw-out range still must be met.

There is, therefore, a need for a housing assembly that provides for a grounded connection over the length of the draw-out path of travel but which does not include a long ground bar. There is a further need for such a housing assembly to accommodate existing electrical switching apparatus.

SUMMARY OF THE INVENTION

These needs, and others, are met by at least one embodiment of the disclosed concept which provides for a housing assembly for an electrical switching apparatus including a sidewall assembly, a movable carriage assembly, a ground bus bar assembly, a movable terminal assembly with an extendable conductor assembly. The sidewall assembly includes a number of sidewalk defining a substantially enclosed space and includes a first sidewall. The movable carriage assembly is movable between a withdrawn, first position, wherein the movable carriage assembly is disposed partially outside the enclosure sidewall assembly enclosed space, and an inserted, second position, wherein the movable carriage assembly is disposed substantially inside the enclosure sidewall assembly enclosed space. The ground bus bar assembly is coupled to the first sidewall. The movable terminal assembly is coupled to the movable carriage assembly whereby the movable terminal assembly moves with the movable carriage assembly. The extendable conductor assembly is coupled to, and in electrical communication with, the ground bus bar assembly.

In this configuration, the movable terminal assembly is grounded, i.e. in electrical communication with the ground bus bar assembly via the extendable conductor assembly as the movable carriage assembly moves between the two positions. That is, the extendable conductor assembly moves between an extended, first configuration and a collapsed, second configuration. That is, when the movable carriage assembly is in the first position, and wherein the movable terminal assembly moves with the movable carriage assembly, the extendable conductor assembly is in the extended, first configuration. Thus, the movable terminal assembly provides a conductor path to the ground bus bar assembly when the movable carriage assembly is in the first position. Further, when the movable carriage assembly is in the second position, and wherein the movable terminal assembly moves with the movable carriage assembly, the extendable conductor assembly is in the collapsed, second configuration. In an exemplary embodiment, an electrical switching apparatus is disposed on the movable carriage assembly and coupled to, and in electrical communication with, the movable terminal assembly. Thus, the electrical switching apparatus is grounded as it moves in and out of a housing assembly wherein the housing assembly does not have a ground bar extending therethrough.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
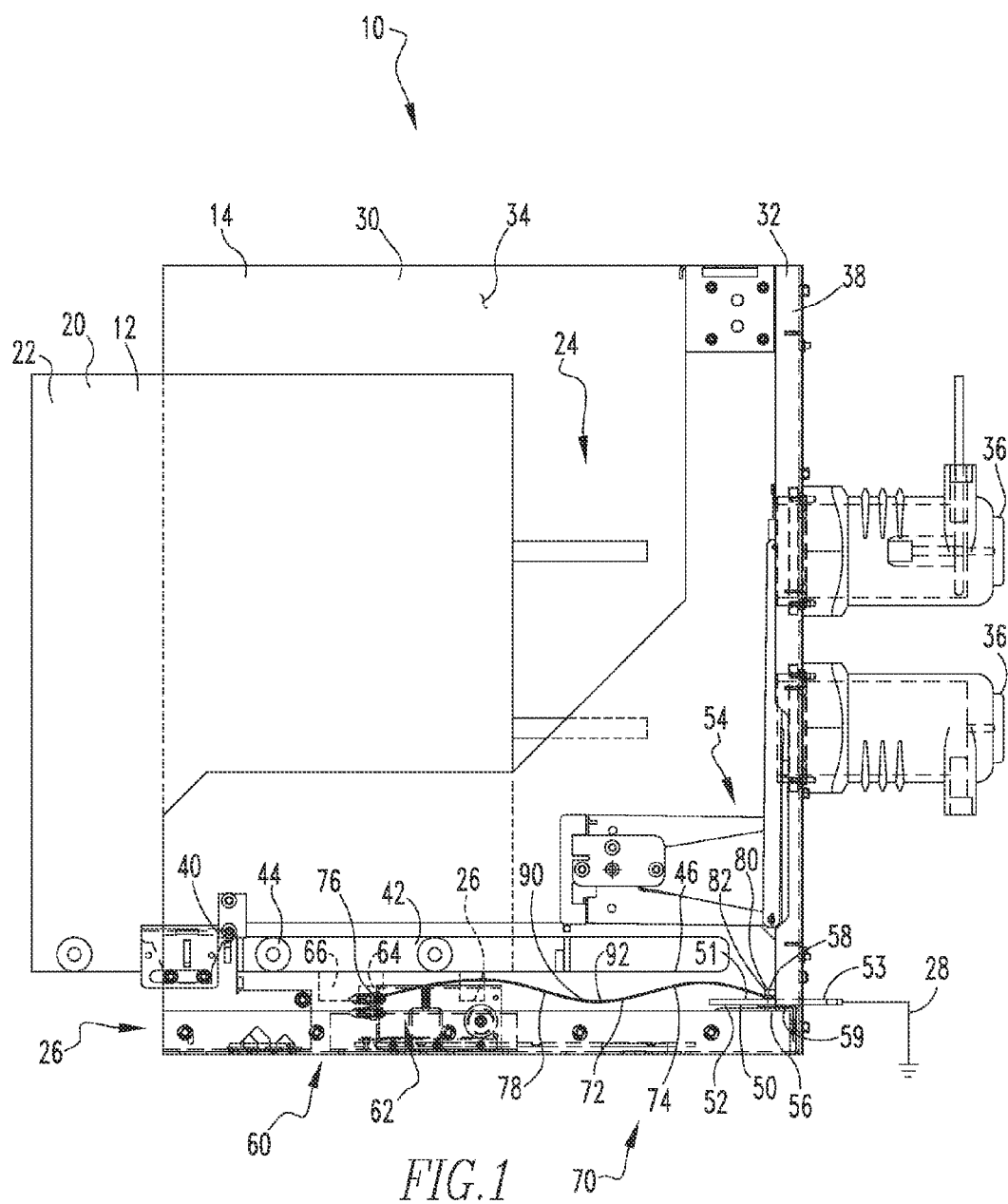
FIG. 1 is a first schematic side view of a movable carriage assembly and an extendable conductor assembly is a first configuration.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. An element resting on another element with no other connection, however, is not linked and therefore is not "coupled." For example, a pen resting on a desk is not "coupled" thereto. A pen chained to a desk is "coupled" thereto. Further, when two elements are coupled, all portions of those elements are coupled; however, a description of a specific portion of a first element being coupled to a second element, e.g., an axle first end being coupled to a first wheel, means that the specific portion of the first element is disposed closer to the second element than the other portions thereof.

As used herein, "directly coupled" means that two elements are directly in contact with each other.

As used herein, "fixedly coupled" or "fixed" means that two components are coupled so as to move as one while maintaining a constant orientation relative to each other.

As used herein, the statement that two or more parts or components "engage" one another shall mean that the elements exert a force or bias against one another either directly or through one or more intermediate elements or components. Further, as used herein with regard to moving parts, a moving part may "engage" another element during the motion from one configuration to another and/or may "engage" another element once in the described configuration. Thus, unless noted otherwise, it is understood that the statements "when element A moves to element A first configuration, element A engages element B," and, "when element A is in element A first configuration, element A engages element B" are equivalent statements and mean that element A either engages element B while moving to element A first configuration and/or element A either engages element B while in element A first configuration.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw. However, when a rotational force is applied to the screwdriver, the screwdriver operatively engages the screw and causes the screw to rotate.

As used herein, "operatively coupled" means that a number of elements or assemblies, each of which is movable between a first position and a second position (or another position), or a first configuration and a second configuration (or another configuration), are coupled so that as the first element moves from one position/configuration to the other, the second element moves between positions/configurations as well. It is noted that a first element may be "operatively coupled" to another without the opposite being true.

As used herein, a "path of travel" is the space occupied by an object as it moves from one location to another. A "path of travel" is inherent to all moving objects.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "planar body" or "planar member" is a generally thin element including opposed, wide, generally flat surfaces as well as a thinner edge surface extending between the wide flat surfaces. The edge surface may include generally flat portions, e.g. as on a rectangular planar member, or be curved, as on a disk, or have any other shape.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

As used herein, "correspond," when used in conjunction with a description of an element's shape or size, indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening is/are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit. In reference to contours, perimeters and similar constructs, "correspond" means the constructs have similar contours, perimeters, shapes, and/or characteristics.

As used herein, and when used in reference to communicating data or a signal, "in electronic communication" includes both hardline and wireless forms of communication.

As used herein, "in electric communication" means that a current passes, or can pass, between the identified elements. Being "in electric communication" is further dependent upon an element's position or configuration. For example, in a circuit breaker, a movable contact is "in electric communication" with the fixed contact when the contacts are in a closed position. The same movable contact is not "in electric communication" with the fixed contact when the contacts are in the open position.

Figure 2:
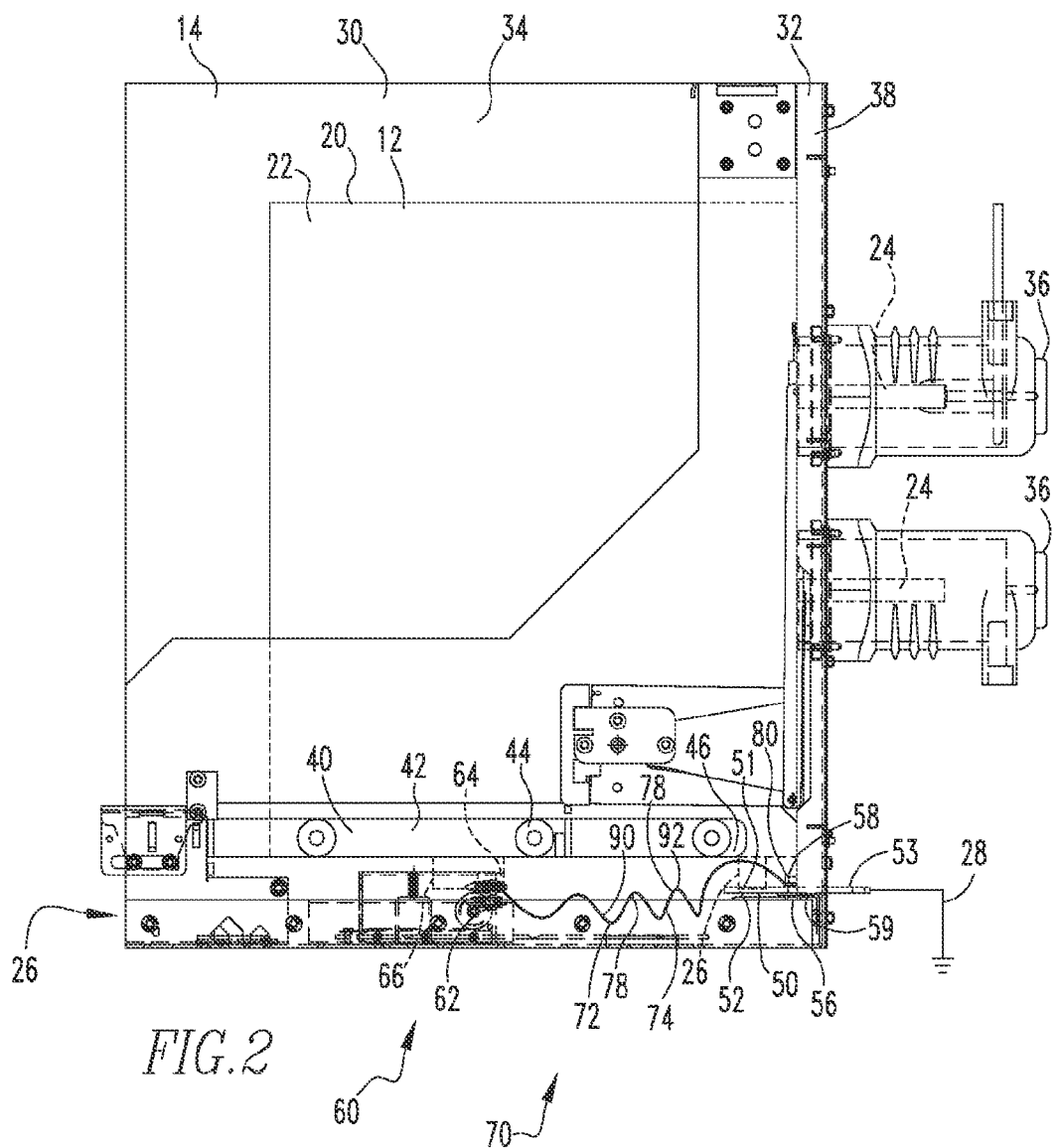
FIG. 2 is a first schematic side view of a movable carriage assembly and an extendable conductor assembly is a second configuration.

As shown in FIGS. 1 and 2, a switchgear 10 includes an electrical switching apparatus 12 and an enclosure housing assembly 14. As used herein, an "electrical switching apparatus" means any electrical apparatus capable of interrupting a current and includes, but is not limited to, a circuit breaker. In an exemplary embodiment, the electrical switching apparatus 12 is a circuit breaker 20, shown schematically. The circuit breaker 20 includes a housing assembly 22 and a conductor assembly 24, as well as other elements. The circuit breaker conductor assembly 24 is, generally, electrically isolated from the circuit breaker housing assembly 22. It is possible, however, for the circuit breaker housing assembly 22, or other elements, to become charged with electricity, including while the circuit breaker 20 is being removed from the enclosure housing assembly 14. As such, the circuit breaker 20 further includes a ground coupling 26 which is structured to be coupled to, and placed in electrical communication with, a ground conductor 28, shown schematically. As used herein, a "ground conductor" is an assembly of conductors, or an element of such an assembly, that is in electrical communication with a large conducting body, such as, but not limited to, the earth which is used as a common return for an electric circuit and as an arbitrary zero of potential.

The enclosure housing assembly 14 includes an enclosure sidewall assembly 30, a movable carriage assembly 40, a ground bus bar assembly 50, and a movable terminal assembly 60 with an extendable conductor assembly 70. The enclosure sidewall assembly 30 includes a number of sidewalls 32 defining a substantially enclosed space 34. In an exemplary embodiment, the sidewalk 32 are substantially planar members. The enclosure sidewall assembly 30 includes a number of electrical couplings 36 that are structured to be coupled to a line and a load (neither shown). The electrical couplings 36 extend through a first sidewall 38 which is often identified as the rear sidewall. In an exemplary embodiment, the front sidewall (not shown) opposite the first sidewall 38 is removable and provides access to the enclosed space 34. Alternatively, the front sidewall is a door, or, is incorporated into the circuit breaker 20.

The movable carriage assembly 40 is a carriage structured to support the circuit breaker 20. In an alternate embodiment, not shown, the movable carriage assembly 40 is fixed to, or incorporated with, the circuit breaker 20. As shown, the movable carriage assembly 40 includes a generally horizontal, planar member 42 and a number of wheels 44. The wheels 44 are rotatably coupled to the lateral sides of the planar member 42. In an exemplary embodiment, as shown, the wheels 44 travel over rails 46 defined by elongated, generally horizontal openings in the lateral sides of the enclosure housing assembly 14. The circuit breaker 20 is disposed on the planar member 42.

The movable carriage assembly 40, and therefore the circuit breaker 20, is movable between a withdrawn, first position, wherein the movable carriage assembly 40 is disposed at least partially outside the enclosure sidewall assembly enclosed space 34, and an inserted, second position, wherein the movable carriage assembly is disposed substantially inside the enclosure sidewall assembly enclosed space 34. It is understood that the circuit breaker 20, and therefore the movable carriage assembly 40 can be removed completely from the enclosure sidewall assembly enclosed space 34 and moved far therefrom; as used herein, that is the "separated position" of the movable carriage assembly 40. As used herein, the movable carriage assembly 40 withdrawn, first position is the position that is satisfactory to perform test operations on the circuit breaker 20 which is not the "separated position" of the movable carriage assembly 40. In an exemplary embodiment, when the movable carriage assembly 40 is in the first position, the circuit breaker 20 is spaced from, and not in electrical communication with, the enclosure sidewall assembly electrical couplings 36.

In an exemplary embodiment, the ground bus bar assembly 50 includes a planar bus bar member 52 and an electrical coupling assembly 54. The planar bus bar member 52 is conductive and, in an exemplary embodiment, made from copper. The planar bus bar member 52 is coupled to, and extends through, the enclosure housing assembly first sidewall 38. That is, the planar bus bar member 52 includes a first portion 51 disposed within the enclosure sidewall assembly enclosed space 34 and a second portion 53 disposed outside the enclosure sidewall assembly enclosed space 34. The planar bus bar member 52 is structured to be coupled to an external ground conductor assembly (not shown). The external ground conductor assembly is coupled to, and in electrical communication with, the planar bus bar member second portion 53.

The ground bus bar assembly coupling assembly 54 is structured to couple, and establish electrical communication between, the planar bus bar member 52 and the extendable conductor assembly 70. In an exemplary embodiment, the ground bus bar assembly coupling assembly 54 is disposed on the planar bus bar member first portion 51 and includes a threaded opening 56 and a threaded fastener 58. As described below, the extendable conductor assembly 70 is disposed between the threaded fastener 58 and the planar bus bar member 52 and the threaded fastener 58 is tightened, thereby fixing the extendable conductor assembly 70 to the planar bus bar member 52, The extendable conductor assembly 70 and the planar bus bar member 52 are also placed in electrical communication with each other.

In an exemplary embodiment, the planar bus bar member 52 has a length of between about 4.0 inches and 8.0 inches, or about 6.0 inches. That is, the planar bus bar member 52 does not have a length that extends over the depth of the enclosure sidewall assembly enclosed space 34, or alternatively, over the path of travel of the movable carriage assembly 40. In this configuration, the planar bus bar member 52 is shorter than the known ground bars. Accordingly, in any claim wherein the length of the planar bus bar member 52 is recited, the length is a significant and/or important feature.

The movable terminal assembly 60 includes two terminal blocks; a housing, first movable secondary wiring terminal block 62 and an electrical switching apparatus, second movable secondary wiring terminal block 64. The housing, first movable secondary wiring terminal block 62 is movably coupled or movably directly coupled to the enclosure housing assembly 14. The housing, first movable secondary wiring terminal block 62 moves between a first position, wherein the housing, first movable secondary wiring terminal block 62 is spaced from the planar bus bar member 52, and a second position, wherein the housing, first movable secondary wiring terminal block 62 is close to the planar bus bar member 52. As used herein, the position of the housing, first movable secondary wiring terminal block 62 position described as "spaced from" and "closer to" are relative positions. That is, when the housing, first movable secondary wiring terminal block 62 is in the first position, it is further away from the planar bus bar member 52 than when the housing, first movable secondary wiring terminal block 62 is in the second position.

The electrical switching apparatus, second movable secondary wiring terminal block 64 is coupled, directly coupled, or fixed to the movable carriage assembly 40 and moves therewith. In an alternate embodiment, the electrical switching apparatus, second movable secondary wiring terminal block 64 is coupled, directly coupled, or fixed to the electrical switching apparatus 12 or, in an exemplary embodiment, to the circuit breaker 20, and moves therewith. Thus, the electrical switching apparatus, second movable secondary wiring terminal block 64 also moves between a between a first position, wherein the housing, first movable secondary wiring terminal block 62 is spaced from the planar bus bar member 52, and a second position, wherein the housing, first movable secondary wiring terminal block 62 is close to the planar bus bar member 52, as described above.

Figure 3:
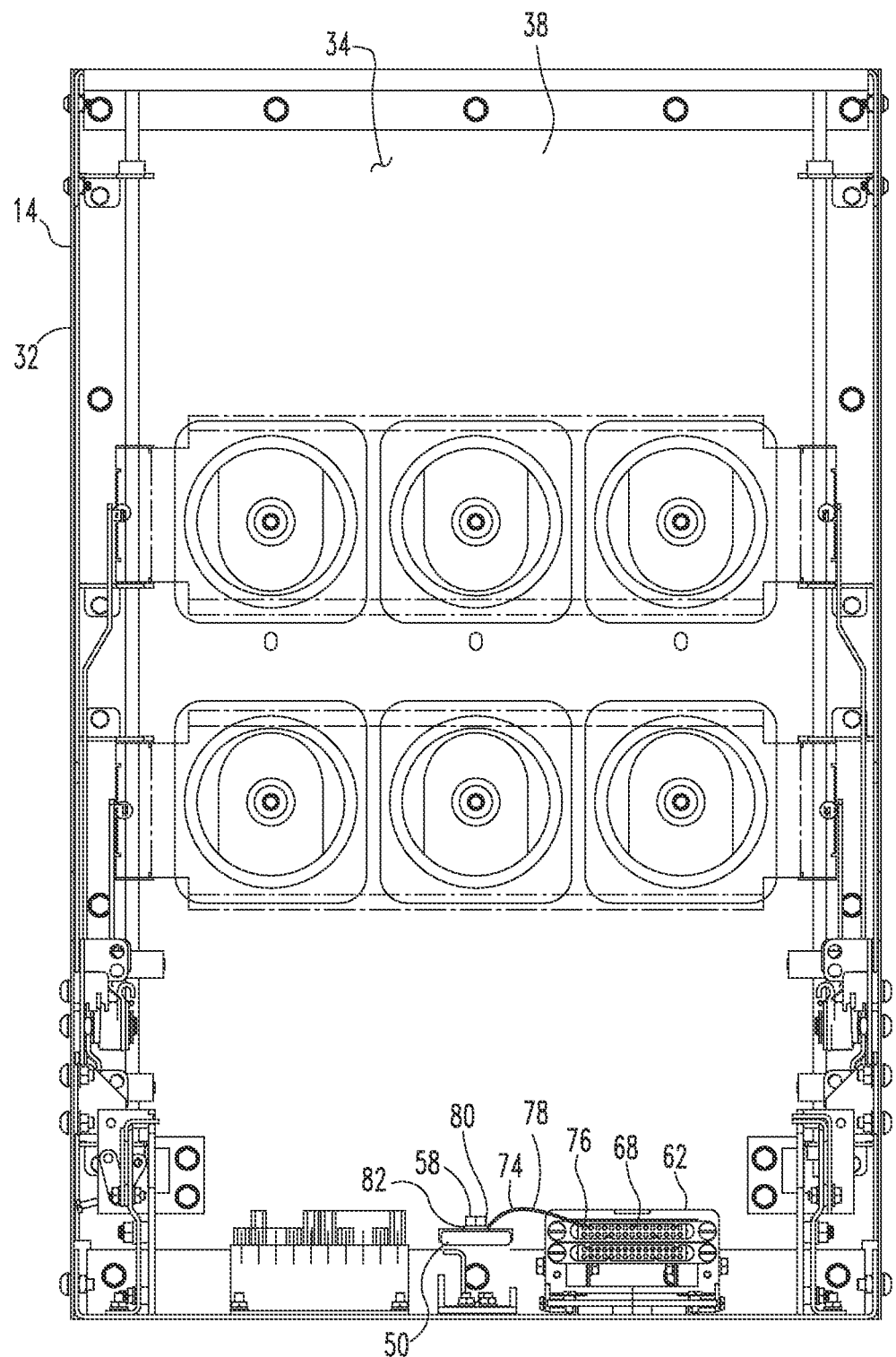
FIG. 3 is a schematic end view of a switchgear with selected elements removed for clarity.

The housing, first movable secondary wiring terminal block 62 and the electrical switching apparatus, second movable secondary wiring terminal block 64 each include a number of conductors (not shown) that are structured to be selectably coupled. In an exemplary embodiment, the electrical switching apparatus, second movable secondary wiring terminal block 64 includes a number of conductive plugs (not shown) and the housing, first movable secondary wiring terminal block 62 includes a number of conductive sockets 68, as shown in FIG. 3. The plugs are sized to correspond to the sockets, or snugly correspond, whereby when a plug is disposed in a socket, the conductive plug and the conductive socket are in electrical communications. As is known, the number of plugs and sockets may be disposed in a non-conductive housing. Thus, the housing, first movable secondary wiring terminal block 62 and the electrical switching apparatus, second movable secondary wiring terminal block 64 may be selectably disposed in an electrically coupled configuration, wherein the plugs and sockets are in electrical communication, or in an electrically decoupled configuration, wherein the plugs and sockets are separated and are not in electrical communication. Unless noted otherwise, the housing, first movable secondary wiring terminal block 62 and the electrical switching apparatus, second movable secondary wiring terminal block 64 are in the electrically coupled configuration hereinafter. Further, a conductor 66, such as but not limited to a copper wire, extends between, and electrically couples, the electrical switching apparatus, second movable secondary wiring terminal block 64 and the electrical switching apparatus 12. This allows the circuit breaker frame assembly (not shown) as well as other selected elements to be grounded.

The movable terminal assembly 60 includes an extendable conductor assembly 70. The extendable conductor assembly 70 includes a conductor construct 72 that is structured to move, and moves, between two configurations, an extended, first configuration and a collapsed, second configuration. The extendable conductor assembly 70 is coupled or directly coupled to, and in electrical communication with, both the ground bus bar assembly 50 and the housing, first movable secondary wiring terminal block 62. That is, in an exemplary embodiment, the conductor construct 72 is an elongated body 74 that includes a first end 76, a medial portion 78 and a second end 80. In an exemplary embodiment, the conductor construct body medial portion 78 is much longer than the ends 76, 80. In an exemplary embodiment, the conductor construct body first end 76 is coupled, directly coupled, or fixed to, and in electrical communication with, the housing, first movable secondary wiring terminal block 62. That is, it is understood that the conductor construct body first end 76 is coupled, directly coupled, or fixed to, and in electrical communication with, a conductive element (not shown) in the housing, first movable secondary wiring terminal block 62. The conductor construct body second end 80 is coupled, directly coupled, or fixed to, and in electrical communication with, the ground bus bar assembly 50. In an exemplary embodiment, the conductor construct body second end 80 includes a loop 82 through which ground bus bar assembly coupling assembly threaded fastener 58 passes.

In an exemplary embodiment, conductor construct 72 is a conductive tension member 90. As used herein, a "tension member" is a construct that has a maximum length, end-to-end when under tension, but which has, or may have, a reduced length end-to-end when not under tension. "Tension members" include, but are not limited to, chains, wires, and springs. In an exemplary embodiment, the conductor construct 72 is a conductive wire 92 such as, but not limited to, a copper wire. The conductor construct 72 is, in an exemplary embodiment, substantially insulated. That is, for example, the conductor construct body medial portion 78 is covered by an insulator leaving only the ends 76, 80 exposed. In an exemplary embodiment, the wire 92 is structured to move, and moves, between two configurations, an extended, first configuration as shown in FIG. 1 and a collapsed, second configuration as shown in FIG. 2.

The elements above are assembled as follows. The circuit breaker 20 is disposed on the movable carriage assembly 40. In an alternate embodiment, the circuit breaker 20 and the movable carriage assembly 40 are part of the same assembly. The electrical switching apparatus, second movable secondary wiring terminal block 64 is coupled to, directly coupled to, or fixed to the movable carriage assembly 40. The electrical switching apparatus, second movable secondary wiring terminal block conductor 66 is coupled to, and placed electrical communication with, the circuit breaker 20. The electrical switching apparatus, second movable secondary wiring terminal block 64 is coupled to, and placed in electrical communication with, the housing, first movable secondary wiring terminal block 62. The extendable conductor assembly 70, i.e. the conductor construct 72 and in an exemplary embodiment, the extendable conductor assembly conductive wire 92, is coupled to, and placed electrical communication with, housing, first movable secondary wiring terminal block 62. That is, conductor construct body first end 76 is coupled, directly coupled, or fixed to, and in electrical communication with, a conductive element (not shown) in the housing, first movable secondary wiring terminal block 62.

The extendable conductor assembly 70, i.e. the conductor construct 72 and in an exemplary embodiment, the extendable conductor assembly conductive wire 92, is also coupled to, and placed in electrical communication with, the ground bus bar assembly 50. That is, the conductor construct body second end 80 is coupled, directly coupled, or fixed to, and in electrical communication with, the ground bus bar assembly 50. In an exemplary embodiment, the ground bus bar assembly coupling assembly threaded fastener 58 is passed through the conductor construct body second end loop 82 and tightened against planar bus bar member 52. In this configuration, there is a current path from the circuit breaker 20 to the ground.

In this configuration, the electrical switching apparatus 12, and in an exemplary embodiment the circuit breaker 20, remains grounded as the movable carriage assembly 40, and therefore the circuit breaker 20, moves between the withdrawn, first position and the inserted, second position. That is, when the movable carriage assembly 40 is in the withdrawn, first position, the extendable conductor assembly 70 is in the extended, first configuration. When the movable carriage assembly 40 is in the inserted, second position, the extendable conductor assembly 70 is in the collapsed, second configuration. As the movable carriage assembly 40 transitions between positions, the extendable conductor assembly 70 transitions between configurations. Thus, the electrical switching apparatus 12, and in an exemplary embodiment the circuit breaker 20, remains grounded as the movable carriage assembly 40, and therefore the circuit breaker 20, moves between the withdrawn, first position and the inserted, second position. Moreover, the electrical switching apparatus 12, and in an exemplary embodiment the circuit breaker 20, remains grounded in an enclosure housing assembly 14 that does not include a planar bus bar member 52 that extends over the path of travel of the movable carriage assembly 40.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A housing assembly for an electrical switching apparatus comprising:
    an enclosure sidewall assembly including a number of sidewalls defining a substantially enclosed space;
    said sidewall assembly number of sidewalls including a first sidewall;
    a movable carriage assembly, wherein said movable carriage assembly is movable between a withdrawn, first position, wherein said movable carriage assembly is disposed at least partially outside said enclosure sidewall assembly enclosed space, and an inserted, second position, wherein said movable carriage assembly is disposed substantially inside said enclosure sidewall assembly enclosed space;
    a ground bus bar assembly coupled to said first sidewall;
    a movable terminal assembly including an extendable conductor assembly;
    said movable terminal assembly coupled to said movable carriage assembly whereby said movable terminal assembly moves with said movable carriage assembly;
    said extendable conductor assembly coupled to, and in electrical communication with, said ground bus bar assembly;
    said movable terminal assembly includes a housing, first movable secondary wiring terminal block and an electrical switching apparatus, second movable secondary wiring terminal block;
    said first movable secondary wiring terminal block movably coupled to said enclosure sidewall assembly;
    said second movable secondary wiring terminal block coupled to said carriage assembly; and
    said extendable conductor assembly coupled to, and in electrical communication with, said first movable secondary wiring terminal block.

2. A housing assembly for an electrical switching apparatus comprising:
    an enclosure sidewall assembly including a number of sidewalls defining a substantially enclosed space;
    said sidewall assembly number of sidewalls including a first sidewall;
    a movable carriage assembly, wherein said movable carriage assembly is movable between a withdrawn, first position, wherein said movable carriage assembly is disposed at least partially outside said enclosure sidewall assembly enclosed space, and an inserted, second position, wherein said movable carriage assembly is disposed substantially inside said enclosure sidewall assembly enclosed space;
    a ground bus bar assembly coupled to said first sidewall;
    a movable terminal assembly including an extendable conductor assembly;
    said movable terminal assembly coupled to said movable carriage assembly whereby said movable terminal assembly moves with said movable carriage assembly;
    said extendable conductor assembly coupled to, and in electrical communication with, said ground bus bar assembly;
    said ground bus bar assembly includes a planar bus bar member and an electrical coupling assembly; and
    said bus bar member coupled to, and extending through, said first sidewall.

3. The housing assembly of claim 2 wherein said ground bus bar assembly electrical coupling assembly is disposed adjacent to said first sidewall.

4. The housing assembly of claim 2 wherein:
    said extendable conductor assembly includes an elongated tension member having a first end and a second end;
    said ground bus bar assembly is structured to fix said tension member second end to said planar bus bar member.

5. The housing assembly of claim 2 wherein said planar bus bar member does not have a length that extends over the path of travel of said movable carriage assembly.

6. The housing assembly of claim 2 wherein said planar bus bar member has a length of between about 4.0 inches and 8.0 inches.

7. The housing assembly of claim 2 wherein said planar bus bar member has a length of about 6.0 inches.

8. A switchgear comprising:
    an electrical switching apparatus;
    an enclosure housing assembly including a sidewall assembly, a ground bus bar assembly, and a movable terminal assembly;
    said enclosure sidewall assembly including a number of sidewalls defining a substantially enclosed space;
    said sidewall assembly number of sidewalls including a first sidewall;
    a movable carriage assembly, wherein said movable carriage assembly is movable between a withdrawn, first position, wherein said movable carriage assembly is disposed at least partially outside said enclosure sidewall assembly enclosed space, and an inserted, second position, wherein said movable carriage assembly is disposed substantially inside said enclosure sidewall assembly enclosed space;
    said ground bus bar assembly coupled to said first sidewall;
    said movable terminal assembly including an extendable conductor assembly;
    said movable terminal assembly coupled to said movable carriage assembly whereby said movable terminal assembly moves with said movable carriage assembly;
    said extendable conductor assembly coupled to, and in electrical communication with, said ground bus bar assembly;

said movable terminal assembly includes a housing, first movable secondary wiring terminal block and an electrical switching apparatus, second movable secondary wiring terminal block;

said first movable secondary wiring terminal block movably coupled to said enclosure sidewall assembly;

said second movable secondary wiring terminal block coupled to said carriage assembly; and said extendable conductor assembly coupled to, and in electrical communication with, said first movable secondary wiring terminal block.

9. A switchgear comprising:

an electrical switching apparatus;

an enclosure housing assembly including a sidewall assembly, a ground bus bar assembly, and a movable terminal assembly;

said enclosure sidewall assembly including a number of sidewalls defining a substantially enclosed space;

said sidewall assembly number of sidewalls including a first sidewall;

a movable carriage assembly, wherein said movable carriage assembly is movable between a withdrawn, first position, wherein said movable carriage assembly is disposed at least partially outside said enclosure sidewall assembly enclosed space, and an inserted, second position, wherein said movable carriage assembly is disposed substantially inside said enclosure sidewall assembly enclosed space;

said ground bus bar assembly coupled to said first sidewall;

said movable terminal assembly including an extendable conductor assembly;

said movable terminal assembly coupled to said movable carriage assembly whereby said movable terminal assembly moves with said movable carriage assembly;

said extendable conductor assembly coupled to, and in electrical communication with, said ground bus bar assembly;

said ground bus bar assembly includes a planar bus bar member and an electrical coupling assembly; and said bus bar member coupled to, and extending through, said first sidewall.

10. The switchgear of claim 9 wherein said ground bus bar assembly electrical coupling assembly is disposed adjacent to said first sidewall.

11. The switchgear of claim 9 wherein:

said extendable conductor assembly includes an elongated tension member having a first end and a second end;

said ground bus bar assembly is structured to fix said tension member second end to said planar bus bar member.

12. The switchgear of claim 9 wherein said planar bus bar member does not have a length that extends over the path of travel of said movable carriage assembly.

13. The switchgear of claim 9 wherein said planar bus bar member has a length of between about 40 inches and 8.0 inches.

14. The switchgear of claim 9 wherein said planar bus bar member has a length of about 6.0 inches.

* * * * *